United States Patent
Hollis et al.

[11] Patent Number: 5,579,885
[45] Date of Patent: Dec. 3, 1996

[54] FIXTURE FOR HANDLING ARTICLES

[75] Inventors: Paul E. Hollis, Harrisburg; Michael G. Kiapokas, Lancaster, both of Pa.

[73] Assignee: The Whitaker Corporation, Wilmington, Del.

[21] Appl. No.: 78,532

[22] Filed: Jun. 17, 1993

[51] Int. Cl.⁶ .................................................. B65G 11/00
[52] U.S. Cl. ........................................ 193/40; 198/345.1
[58] Field of Search ................................ 193/32, 40, 2 C, 193/25 R, 25 A, 25 S; 198/345.1, 463.6; 29/429, 281.1, 747–749, 759, 760

[56] References Cited

U.S. PATENT DOCUMENTS

| | | | |
|---|---|---|---|
| 3,696,756 | 10/1972 | Elmore | 198/345.3 |
| 4,099,607 | 7/1978 | Brennan et al. | 193/2 C |
| 4,519,129 | 5/1985 | Caveney et al. | 29/749 |
| 4,610,207 | 9/1986 | Uttscheid | 198/345.3 |
| 4,898,268 | 2/1990 | Kamioka et al. | 198/345.1 |
| 4,955,927 | 9/1990 | Aiello | 29/747 |

*Primary Examiner*—Joseph E. Valenza
*Attorney, Agent, or Firm*—Robert J. Kapalka

[57] ABSTRACT

A fixture for handling an article comprises a body which defines a track having a length which extends between upstream and downstream ends. The track is configured for confining the article to sliding movement along the length of the track. The track is open to an outside of the body along at least a portion of its length so as to provide access for performing an operation of the article. The body has a first finger mechanism disposed relatively upstream along the track for permitting the article to pass along the track in a downstream direction and for preventing the article to pass the first finger mechanism in an upstream direction. A second finger mechanism is disposed downstream from the first finger mechanism for preventing inadvertent downstream movement of the article.

19 Claims, 9 Drawing Sheets

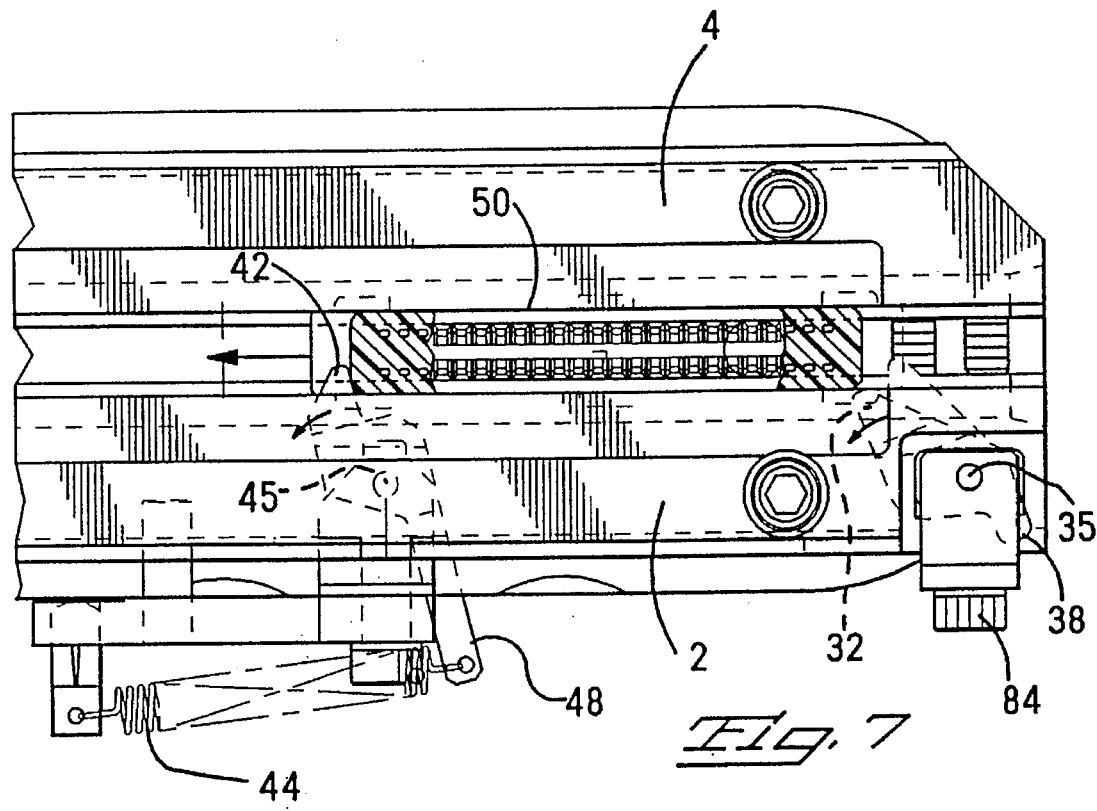
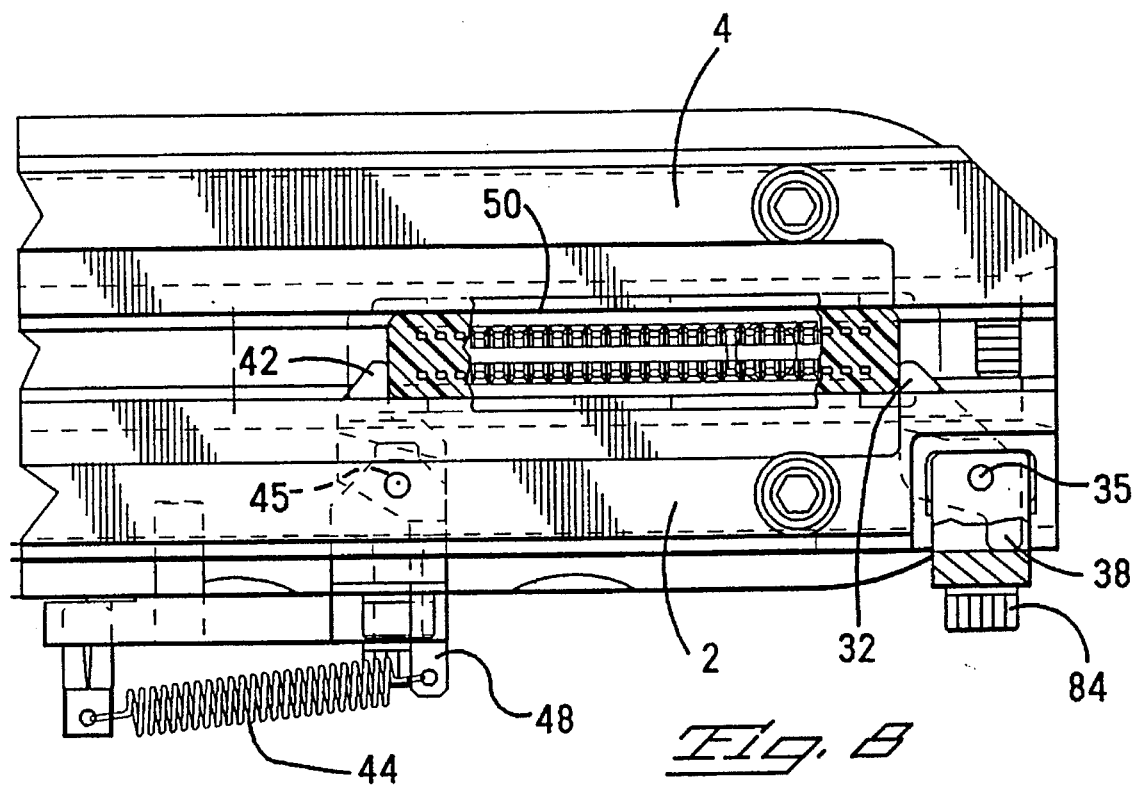

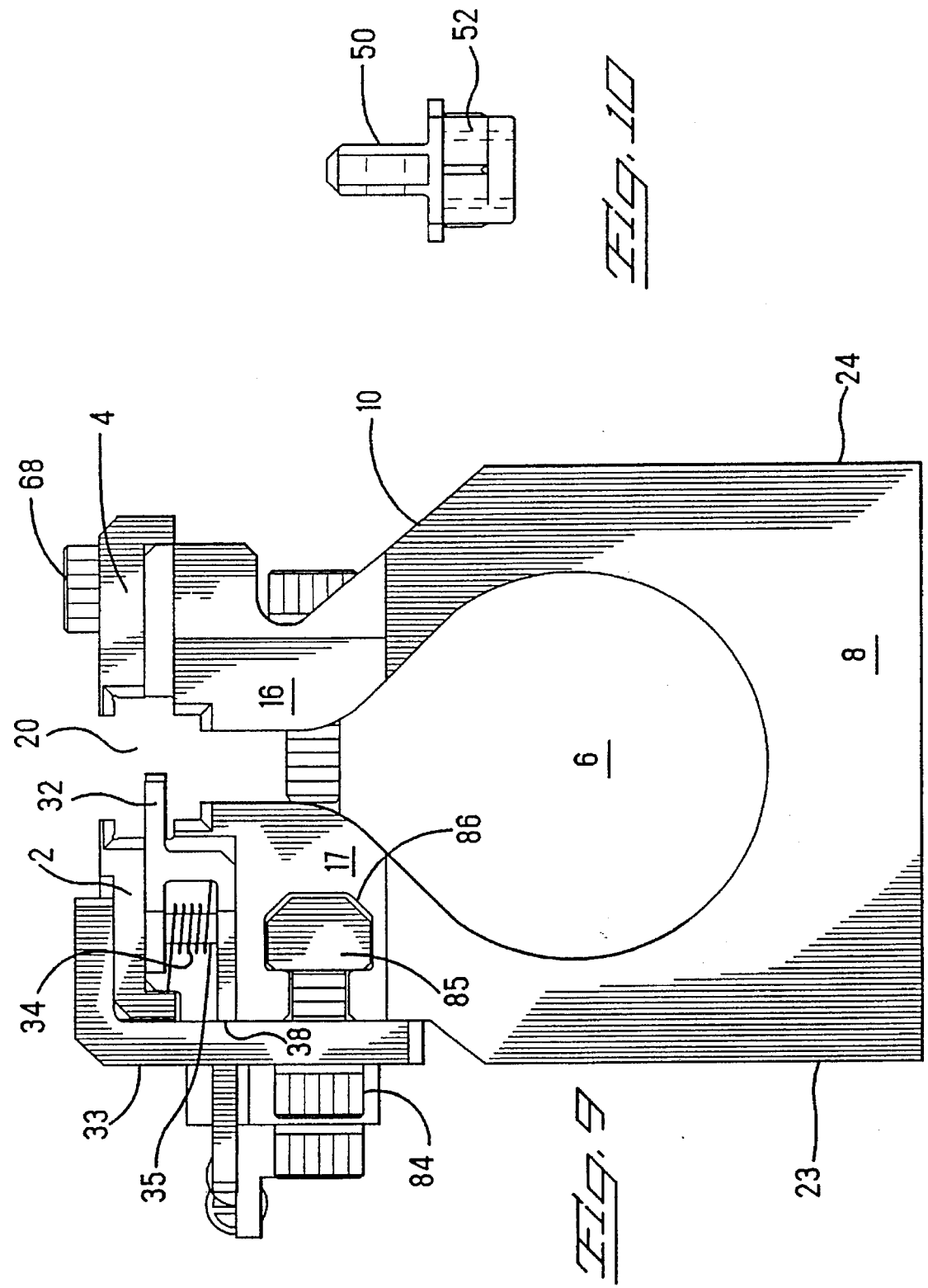

5,579,885

FIXTURE FOR HANDLING ARTICLES

FIELD OF THE INVENTION

The invention relates to the field of devices for handling articles while performing an operation on the articles, and more particularly, to an article handling device which defines a track for the articles and includes means for fixing the articles with respect to the track so that an operation may be performed on the articles.

BACKGROUND OF THE INVENTION

Many types of electrical connectors have a dielectric body defining a plurality of cavities which receive conductive contacts therein. Fixtures are known for securing the electrical connectors in position while the contacts are inserted in the cavities. These types of electrical connectors typically are members of a family which is made up of several connectors each having a different shape and/or size within the same family. The fixtures for securing the connectors may be custom designed to secure connectors having a single configuration of shape and size. These fixtures lack the versatility of being able to handle different connectors within the same family. Alternatively, the fixtures may be adjustable in order to accommodate a number of connectors in the same family which have different shapes and sizes. The adjustable fixtures are versatile, but are often complex and difficult to adjust. Further, it is common to use releasable locking devices such as threaded fasteners or resilient clips to secure the connectors to the fixture. The locking devices must be loosened or released in order to transfer the connectors into and out of the fixture. Releasing and resecuring the locking devices may take a significant amount of time and substantially reduce the production rate of finished products. There is a need for a fixture which is easily adjustable to secure connectors or other articles having different lengths and which is alterable to secure articles having different configurations.

The present invention provides an article handling fixture which defines a track for confining the articles to movement therealong. The fixture includes means for fixing an article with respect to the track so that an operation may be performed on the article. The fixture is particularly suitable for handling electrical connector housings which receive contacts within cavities in the housings.

SUMMARY OF THE INVENTION

A fixture for handling an article according to the invention comprises a body defining a track which has a length extending between upstream and downstream ends. The track is configured for confining the article to sliding movement along the length of the track. The track is open along at least a portion of its length to provide access for performing an operation on the article. The body has a one-way check means disposed relatively upstream along the track for permitting the article to pass along the track in a downstream direction and for preventing the article to pass the check means in the upstream direction. A compliant stop means is disposed downstream from the check means for fixing the article with respect to the track so that the operation may be performed. The stop means is operable to permit the article to pass in the downstream direction after the operation is performed.

According to one embodiment of the invention, the stop means is spaced from the check means by a distance equal to a length of the article, such that the fixing of the article with respect to the track comprises the article being confined between the check means and the stop means. In this embodiment, the distance between the check means and the stop means may be adjustable.

According to another embodiment of the invention, at least one of the check means and the stop means comprises an arm member attached to the body and movable between a first position extending into the track, and a second position withdrawn from the track. A spring member biases the arm member into the first position wherein the article is prevented from passing in the upstream direction. The arm member is movable against the spring biasing to permit the article to pass in the downstream direction.

According to another embodiment of the invention, the body has a substantially C-shaped cross-section, and the track is defined between free ends of the C-shaped cross-section. Means for adjusting a dimension between the free ends is provided in order to accommodate articles having different sizes. Gib members are removably attached at the free ends and are machined to define a portion of the track according to a configuration of the articles.

BRIEF DESCRIPTION OF THE DRAWINGS

There are shown in the drawings the embodiments of the invention that are presently preferred. It should be understood, however, that the invention is not limited to the precise arrangements and instrumentalities shown in the drawings, wherein:

FIG. 7 is a partial top view of the fixture showing the article at a further stage of insertion beyond that of FIG. 6, the article about to pass beyond the check means.

FIG. 8 is a partial top view of the fixture showing the article being engaged between the check means and the stop means.

FIG. 9 is an end view of the fixture taken along line 9—9 of FIG. 1.

FIG. 10 is an end view of an article with which the fixture can be used.

DETAILED DESCRIPTION OF THE PREFERRED EMBODIMENTS

Figure 1:
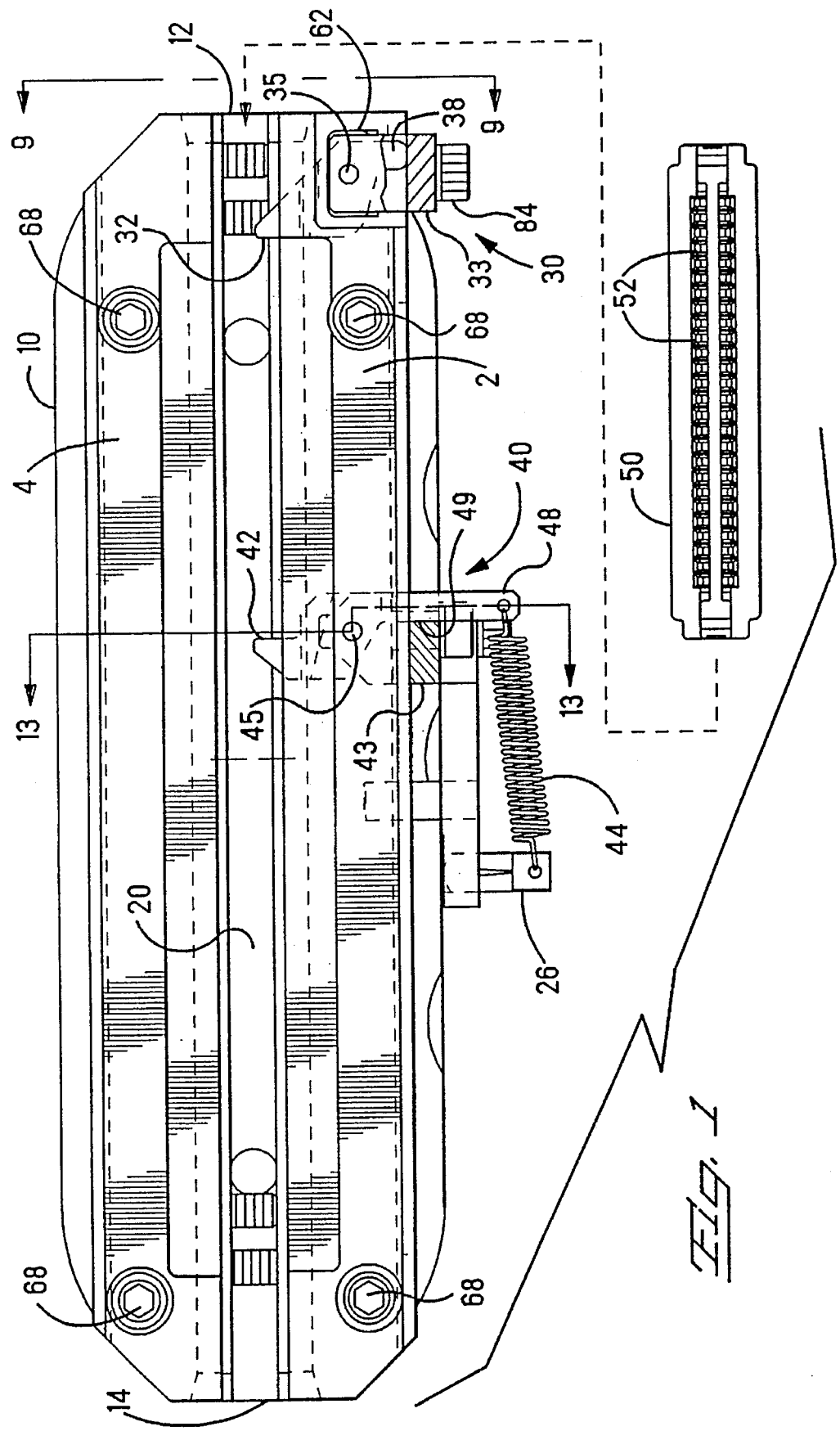
FIG. 1 is a top view of a fixture for handling articles according to the invention, and an article to be inserted therein.
Figure 2:
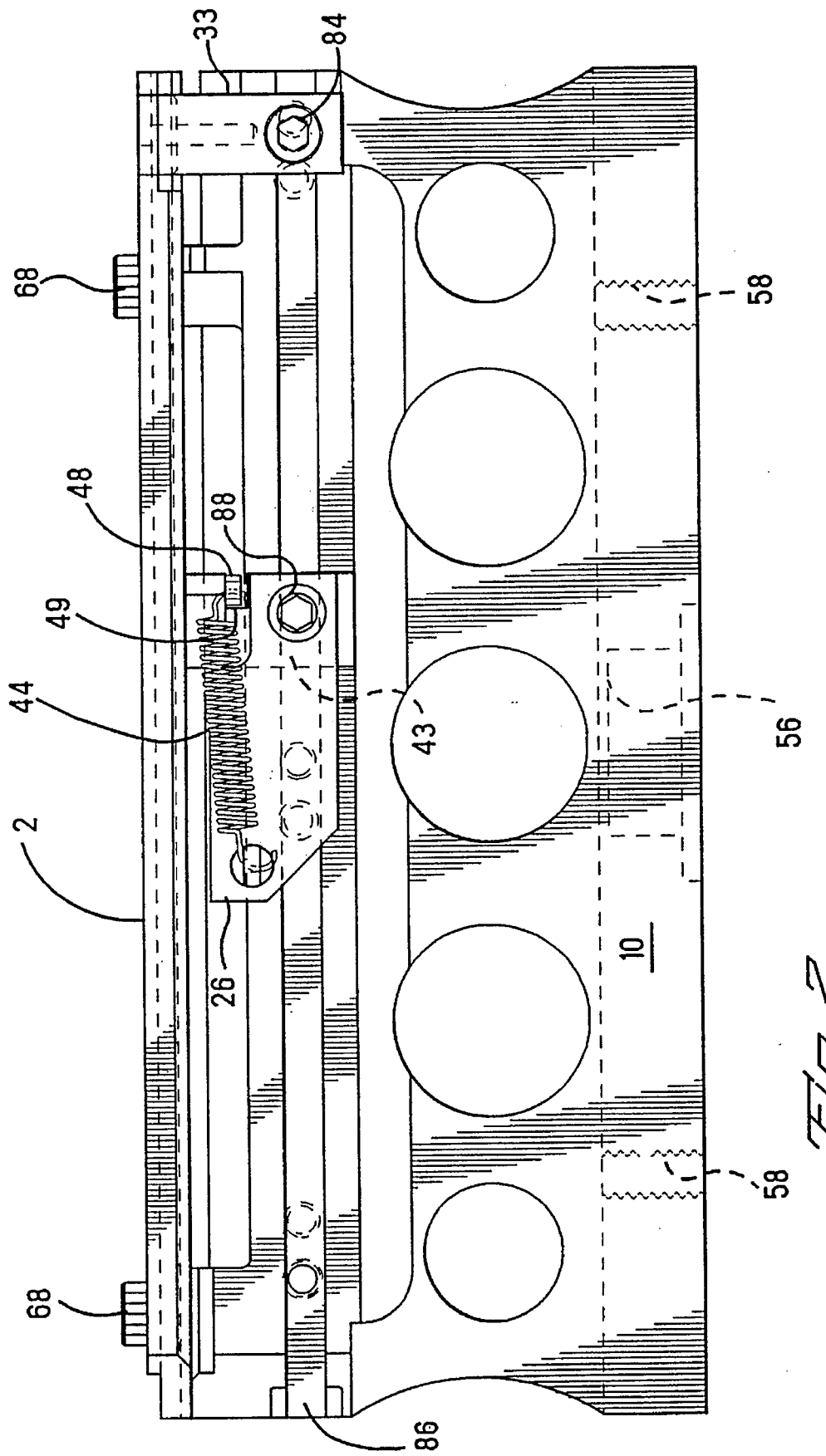
FIG. 2 is a side view of the fixture.
Figure 3:
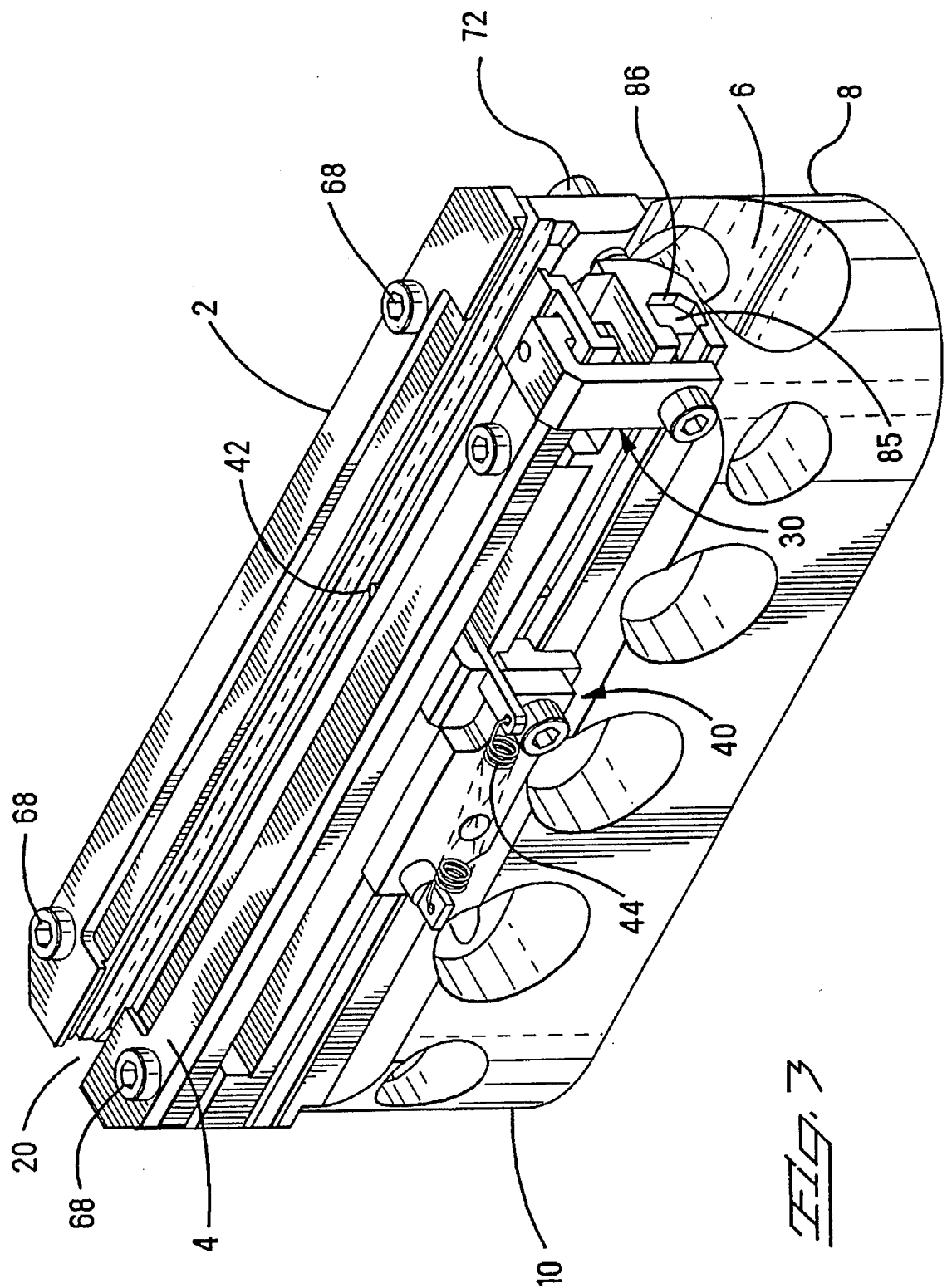
FIG. 3 is an isometric view of the fixture.

As shown in FIGS. 1–4 and 9, a fixture for handling an article according to the invention comprises a body 10 defining a track 20 which has a length extending between upstream and downstream ends. In a preferred embodiment as shown in FIG. 9, the body 10 has a substantially C-shaped cross-section which is oriented with free ends 16, 17 of the C-shaped body extending upwardly. The track 20 is defined between opposed facing surfaces of the free ends 16, 17, the opposed facing surfaces being machined to define a profile which accommodates a shape of the article to be handled by the fixture.

In one embodiment of the invention as shown in FIGS. 1–4 and 9, the body 10 includes a main body portion 8 and gibs 2, 4 attached to the free ends 16, 17 of the C-shaped cross-section. The main body portion 8 defines a hollow interior 6. The gibs 2 and 4 are removably attached to the main body portion 8 by threaded fasteners 68. In the embodiment shown, the gibs 2 and 4 cooperate with the main body portion 8 to define the track 20 between the free ends 16, 17. Alternatively, the gibs 2 and 4 could be made larger and the track 20 could be defined entirely therebetween, or the gibs 2 and 4 could be eliminated and the track 20 could be defined entirely by the main body portion 8 between the free ends thereof.

The track 20 is machined in the body 10 with a cross-section which is configured for confining the article to sliding movement along the length of the track. It is a characteristic of the invention that the fixture can accommodate a family of articles which vary in cross-sectional size and shape. In order to accomplish this, the removable gibs 2, 4 may be replaced with different gibs which are machined for the different sizes and shapes of the articles in the family.

In the preferred embodiment as shown in the drawings, the upstream and downstream ends of the track 20 correspond to extreme ends 12 and 14, respectively, of the body 10. However, it will be understood by those skilled in the art that the track 20 need not extend between the extreme ends 12 and 14 of the body, but may instead extend along a portion of the body 10 intermediate the extreme ends 12, 14 and have entrance and exit passages at a side of the body 10.

The fixture according to the invention is especially suitable for handling an article 50 which is a representative one of a family of electrical connectors. The article 50 has an elongated plastic body defining cavities 52 into which electrical contacts are to be inserted. The track 20 is configured to slidingly receive the article 50 which is oriented with its direction of elongation parallel to the length of the track. The fixture has means for holding the article 50 in a fixed relative position while providing access for inserting contacts into the cavities 52 and for performing subsequent optical inspections to ensure that a contact has been inserted into each of the cavities and that the contacts are inserted correctly in the cavities.

Sides 23, 24 of the body 10 extend parallel to the track 20. One or both of the sides 23, 24 may be machined to close tolerances for precise location with respect to the track 20, thereby to provide a positional reference surface for the fixture. In a machine for performing an operation on the article 50, the positional reference surface defined by one of the sides 23, 24 may be abutted against a locating surface of the machine so as to precisely locate the track 20, and the article 50, with respect to the machine.

According to the invention, the track 20 is open along at least a portion of its length. In the preferred embodiment as shown in FIG. 9, the track 20 is open at the top to an outside of the body 10, and is open at the bottom to the hollow interior 6 of the body 10. The open portions of the track 20 provide access for performing operations on the article 50 which is confined along the track.

A first finger mechanism 30 is disposed relatively upstream along the track. The first finger mechanism 30 provides a one-way check means for permitting the article 50 to pass along the track in a downstream direction, and preventing the article 50 to pass the check means in an upstream direction. A second finger mechanism 40 is disposed downstream from the first finger mechanism 30. The second finger mechanism 40 provides a compliant stop means for preventing inadvertent downstream movement of the article 50 along the track 20 so that an operation may be performed on the article. The second finger mechanism 40 is operable to permit the article 50 to pass in the downstream direction after the operation has been performed.

In the preferred embodiment of the invention, the finger mechanisms 30, 40 are spaced apart by a distance equal to a length of the article 50 so that the article 50 may be confined therebetween. However, other mechanisms for fixing the article 50 with respect to the track 20 will become apparent to those skilled in the art, and all such mechanisms are considered to be within the scope of the invention.

Figure 4:
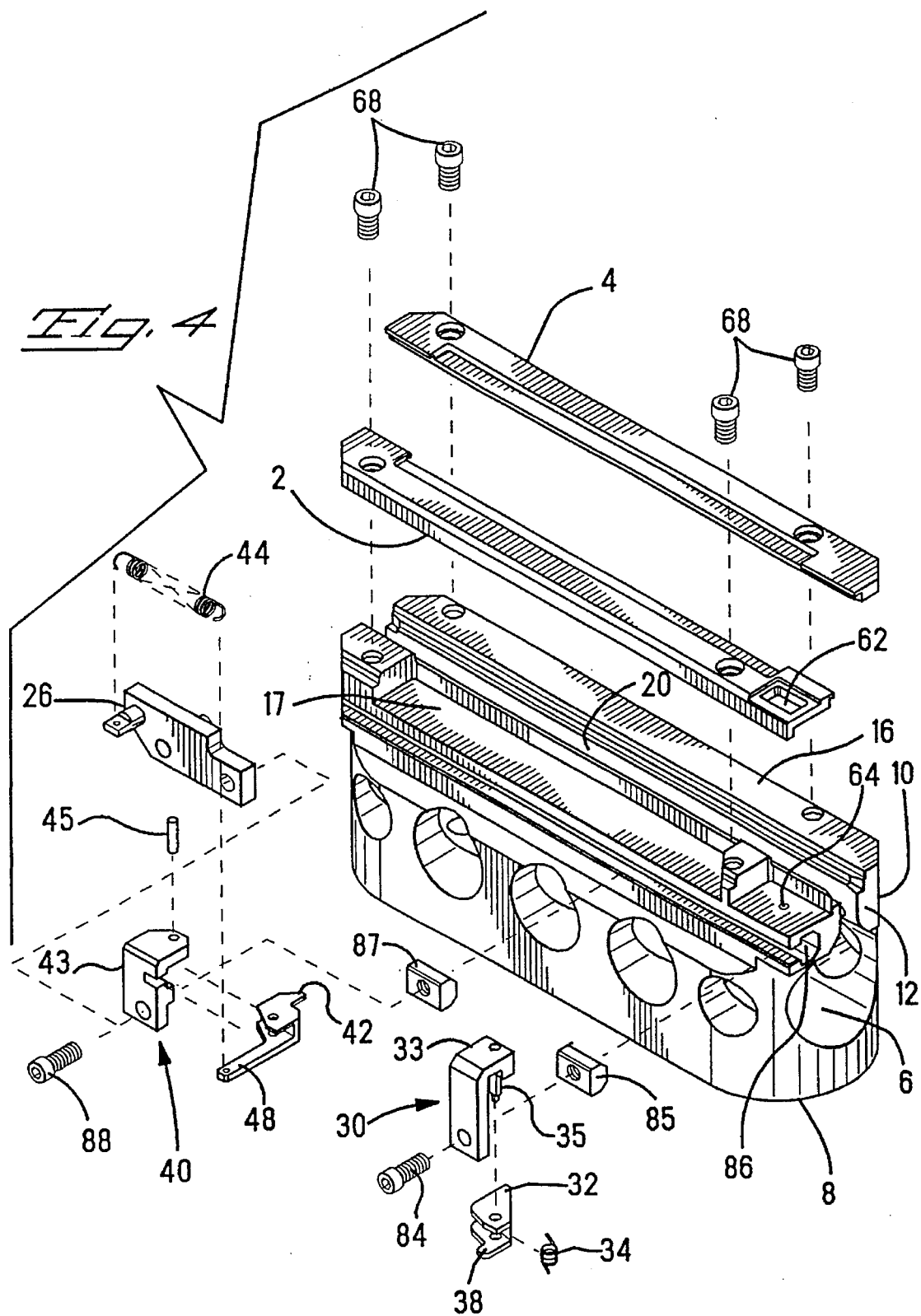
FIG. 4 is an exploded isometric view of the fixture.

As shown in the drawings, the first and second finger mechanisms 30, 40 each comprise a pivotably movable finger 32, 42, respectively. The finger 32 is pivotably mounted on a pin 35 which is frictionally engaged in and extends from a bracket 33. The bracket 33 is removably attached to the body 10 by threaded fastener 84 which engages a nut 85 received in slot 86 in the body 10. In the preferred embodiment a hook portion of the bracket 33 extends through aperture 62 defined by the gib 2, as shown in FIG. 1. The pin 35 extends from the hook portion of the bracket 33 and is received in cavity 64 in the main body portion 8, as shown in FIG. 4, thus ensuring that the finger mechanism 30 remains fixed with respect to the body 10.

Figure 5:
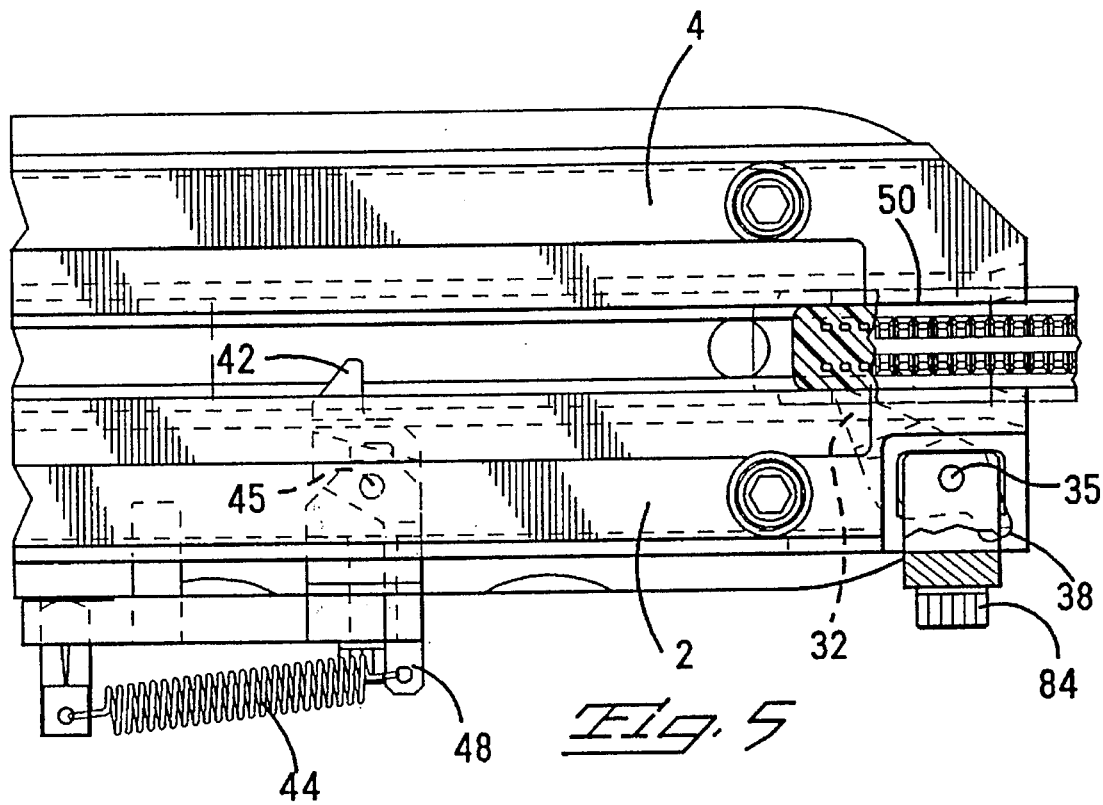
FIG. 5 is a partial top view of the fixture showing the article being inserted into a track at an upstream end of the fixture and beginning to pass a check means.

The finger 32 is pivotably movable between a first position extending into the track 20 and a second position withdrawn from the track 20. A torsion spring 34 mounted over the pin 35 urges an extension 38 of the finger 32 to abut against the bracket 33, thus biasing the finger 32 into the first position. When the finger 32 is in the first position it defines a datum against which the article 50 can be precisely located. In this position the finger 32 at least partially blocks the track 20 so as to provide an obstruction to free movement of the article 50 therealong. As shown in FIG. 5, the article 50 can be inserted into the track 20 so that the article 50 engages the finger 32 and causes pivoting movement of the finger 32 to the second position against the bias of the spring 34.

Figure 13:
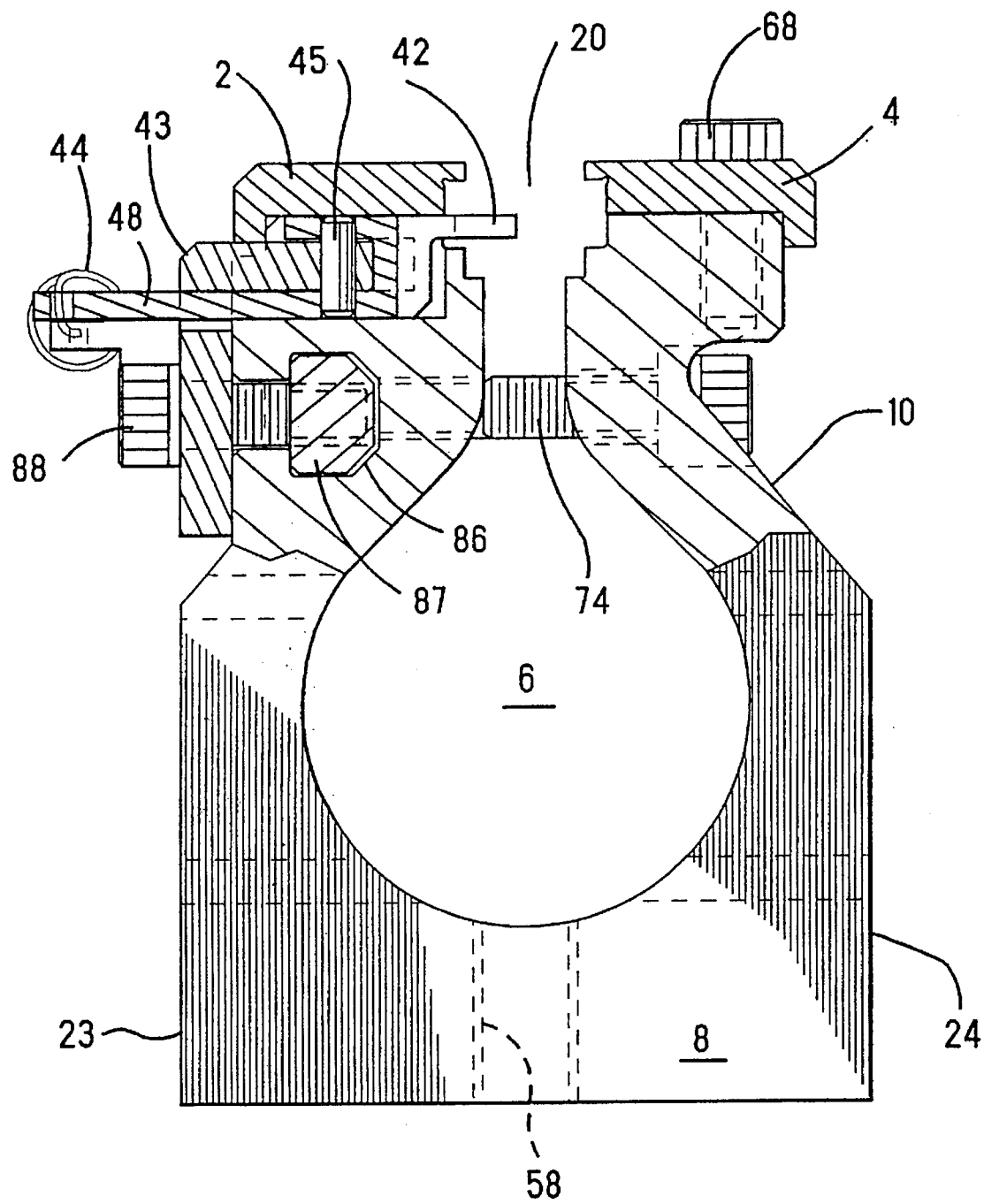
FIG. 13 is a cross-sectional view of the fixture taken along line 13—13 of FIG. 1.

The second finger mechanism 40 is similar in structure and operation to the first finger mechanism 30. As shown in FIGS. 1, 4 and 13, the finger 42 is pivotably mounted on a pin 45 which is frictionally engaged in and extends from a bracket 43. The bracket 43 is removably attached to the body 10 by threaded fastener 88 which engages nut 87 received in the slot 86 in the body 10. The slot 86 extends along the body 10 parallel to the track 20, and the finger mechanism 40 is adjustable in position along the length of the track 20 by loosening the fastener 88 and sliding the nut 87 along the length of the slot 86, whereby the slot 86, the nut 87 and the fastener 88 provide a means for adjusting a distance between the check means and the stop means. An alternative means for adjusting the distance between the check means and the stop means could be provided by a series of spaced apart apertures, for example, threaded holes, extending along the body 10 parallel to the track 20 which could removably receive a locking device, for example the fastener 88.

The finger 42 of the second finger mechanism 40 is pivotably movable between first and second positions extending into and withdrawn from the track 20, respectively. An extension spring 44 is connected at one end to a mount 26 attached to the bracket 43, and at the other end to an extension 48 of the finger 42. The spring 44 urges contact portion 49 of the extension 48 to abut against the bracket 43, thus biasing the finger 42 to the first position.

Loading of the article 50 into the fixture according to the invention will now be explained with reference to FIGS. 5–8. Initially, the second finger mechanism 40 must be adjusted in position relative to the first finger mechanism 30 in order to accommodate the length of the article 50, since the fixture is capable of accommodating articles having different lengths. The finger mechanisms 30, 40 must be spaced apart by a distance which is equal to or greater than a length of the article 50 so that the article 50 may be confined therebetween. This spacing is ordinarily accomplished by inserting the article 50 into the track 20 and sliding the article 20 beyond the first finger mechanism 30. With the fastener 88 loosened, the second finger mechanism 40 can be adjustably moved with respect to the first finger mechanism 30. Ordinarily, the finger mechanisms 30, 40 will be spaced apart so that the article 50 is confined between the fingers 32, 42 without free play. However, for some operations it may be sufficient if the article 50 is confined with some free play between the fingers 32, 42, thereby avoiding the need to precisely adjust the spacing between the fingers. In addition, the fixture according to the invention can be adjusted to confine two or more of the articles 50 between the finger mechanisms 30, 40.

Figure 6:
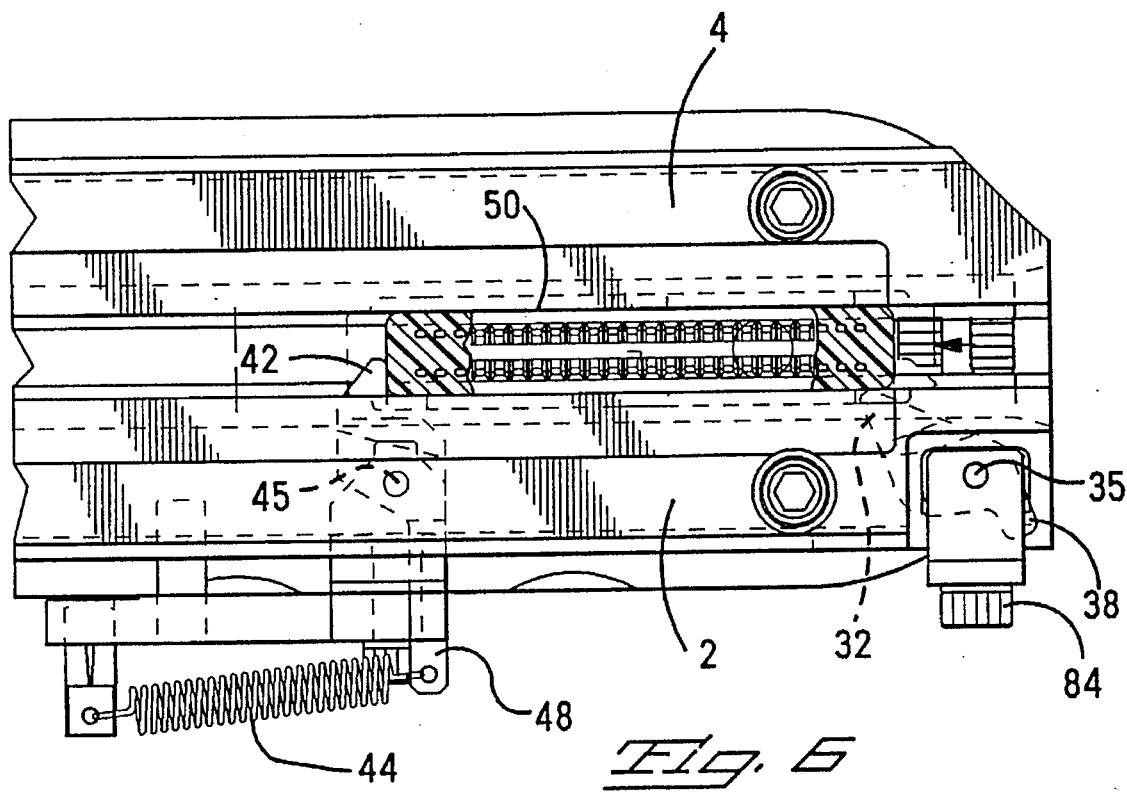
FIG. 6 is a partial top view of the fixture showing the article at a further stage of insertion beyond that of FIG. 5, the article beginning to encounter a stop means.
Figure 11:
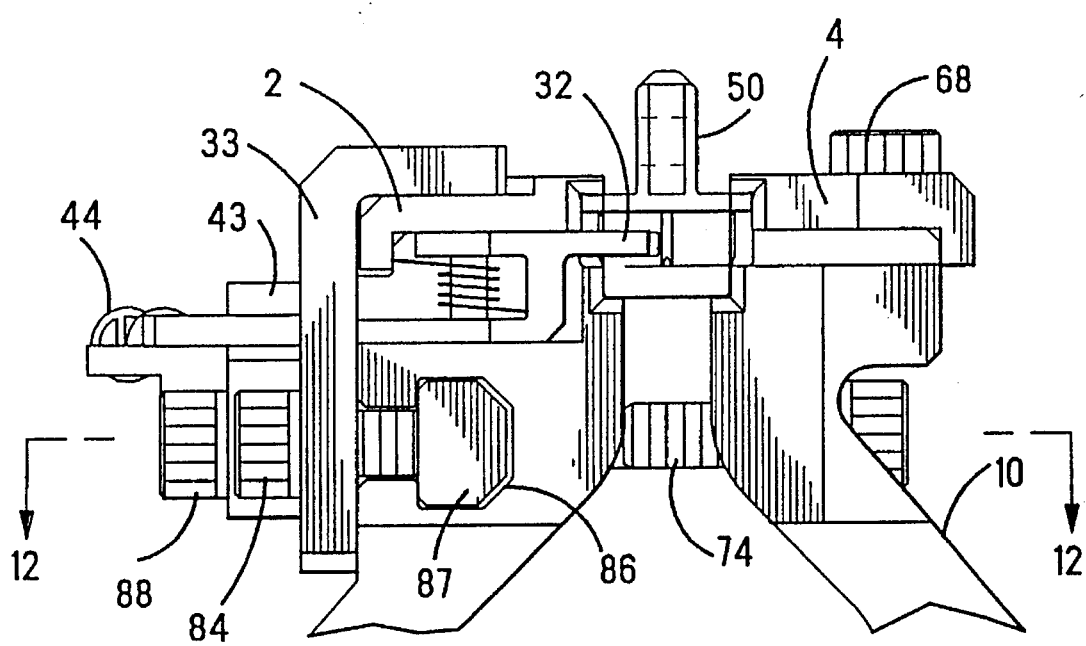
FIG. 11 is a partial view of FIG. 9 showing the article disposed in the track.

FIG. 5 illustrates the article 50 being initially inserted into the track 20 at the upstream end 12. The article 50 can be inserted into the fixture by hand or automated machinery. A light pressure must be applied to the article 50 to overcome the bias of the spring 34 and pivot the finger 32 to the second position as shown in FIG. 5. Continued light pressure must be applied to continue sliding the article 50 along the track 20 and overcome friction generated between the finger 32 and a side of the article 50. FIG. 6 illustrates the article 50 coming to bear against the finger 42 of the second finger mechanism 40. The article 50 must be urged slightly further downstream against the bias exerted by the spring 44 on the finger 42 to pivot the finger 42 slightly away from the first position, as shown in FIG. 7, until the article 50 just passes beyond the finger 32. At this point, the finger 32 is released behind the article 50 and pivoted back to the first position by the bias of the spring 34. Pressure on the article 50 can then be released, whereupon the finger 42 is pivoted backward by the spring 44 and the article 50 becomes confined between the fingers 32 and 42, as shown in FIG. 8. Operations on the article 50 which exert forces in a direction perpendicular to the track 20, such as inserting contacts into the cavities 52, can now be performed, along with optical and other inspection operations.

The hollow interior 6 of the body 10 is accessible through apertures at the upstream and downstream ends 12, 14 of the body 10, thereby providing an interior passageway extending parallel to the track 20. Optical inspection devices can be inserted into the passageway to inspect for the existence of a contact in each of the cavities 52 and for correct insertion of the contacts in the cavities.

Upon completion of all operations on the article 50, pressure is exerted on the article 50 to pivotably move the finger 42 to the second position in opposition to the bias of the spring 44, thereby permitting the article 50 to be moved along the track 20 until it exits the fixture at the downstream end 14.

Figure 12:
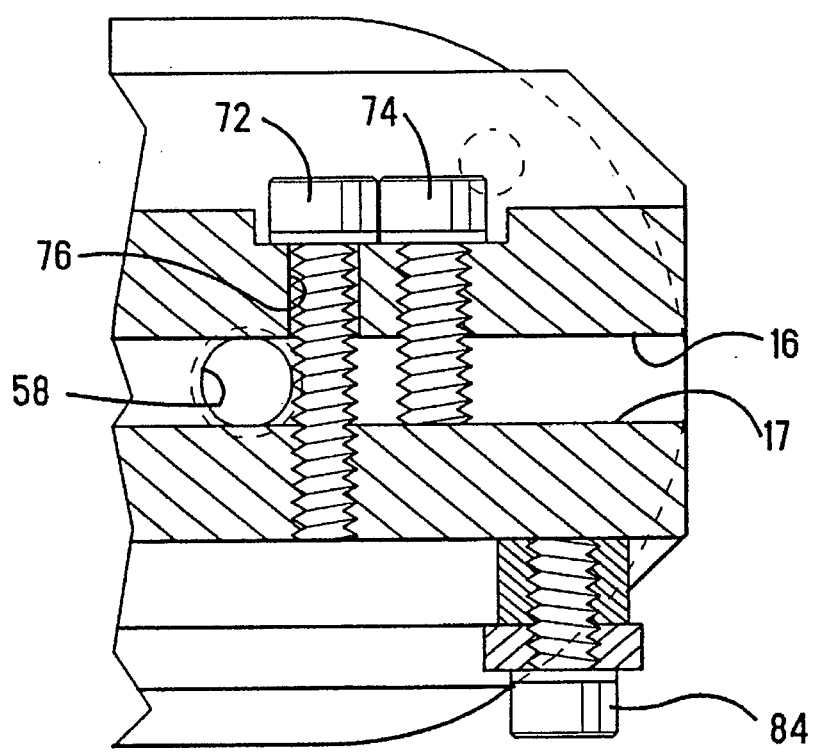
FIG. 12 is a partial cross-sectional view taken along line 12—12 of FIG. 11, showing a means for adjusting a width of the track.

In order to more precisely control the sliding of the article 50 in the track 20, the fixture may include means for adjusting a dimension between the free ends 16 and 17 of the body 10, thereby providing a means to adjust the width of the track 20. In the preferred embodiment the means for adjusting comprises three pairs of threaded jackscrews 72, 74. As shown in detail in FIG. 12, jackscrew 72 extends through smooth hole 76 in the free end 16 and is threadedly engaged in the free end 17. Jackscrew 74 is threadedly engaged in the free end 16 such that a tip of the jackscrew 74 may be brought to bear upon the free end 17. A nominal dimension exists between the free ends 16, 17 when the body 10 is in an unstressed condition. The nominal dimension can be decreased by turning in the jackscrew 72 to bring the free ends 16 and 17 closer together. Conversely, the nominal dimension can be increased by backing out the jackscrew 72 and turning in the jackscrew 74 to drive the free ends 16 and 17 farther apart. The jackscrews 72, 74 provide a means to make fine adjustments, on the order of a few thousandths of an inch, in the width of the track 20 so that manufacturing tolerances can be negated. The jackscrews also provide a means to hold the desired track width. By slightly preloading each of the jackscrews so that the jackscrew 72 is in tension and the jackscrew 74 is in compression, opposing forces in the jackscrews will act to maintain the set width of the track 20.

The fixture has means for attachment to a support such as in an automatic machine for inserting contacts in an electrical connector. Threaded holes 58 in a base of the body 10 can receive threaded fasteners for attachment to a support. A cavity 56 in the base of the body 10 is precisely located with respect to the track 20 to provide a datum reference feature for the fixture. The cavity 56 is adapted to receive a complementary datum member of an automatic machine.

Although the invention has been disclosed as having two finger mechanisms 30, 40, additional finger mechanisms may be incorporated to control movement of the article 50 along the track 20, all within the scope of the invention.

The invention having been disclosed, a number of variations will now become apparent to those skilled in the art. Whereas the invention is intended to encompass the foregoing preferred embodiments as well as a reasonable range of equivalents, reference should be made to the appended claims rather than the foregoing discussion of examples, in order to assess the scope of the invention in which exclusive rights are claimed.

We claim:

1. A fixture for handling an article, comprising:

a body defining a track which has a length extending between upstream and downstream ends, the track being configured for confining the article to sliding movement along the length, the track being open along at least a portion of the length so as to provide access for performing an operation on the article a check means disposed relatively upstream along the track for permitting the article to pass along the track in a downstream direction and for preventing the article to pass the check means in an upstream direction; and, a stop means disposed downstream from the check means for fixing the article with respect to the track so that the operation may be performed, the stop means being operable to permit the article to pass in the downstream direction after the operation has been performed;

wherein at least one of the check means and the stop means comprises a finger member pivotable between a first position extending into the track wherein the article is prevented from passing in the upstream direction, and a second position withdrawn from the track, and further comprising a spring member biasing the finger member to the first position, the finger member being pivotable to the second position against the biasing of the spring member upon application of a downstream force to permit the article to pass in the downstream direction.

2. The fixture according to claim 1, wherein the stop means is spaced from the check means by a distance equal to a length of the article, such that the fixing of the article with respect to the track comprises the article being confined between the check means and the stop means.

3. The fixture according to claim 2, further comprising means for adjusting the distance between the check means and the stop means.

4. The fixture according to claim 1, wherein the body has a substantially C-shaped cross-section, and the track is defined between free ends of the C-shaped cross-section.

5. The fixture according to claim 4, further comprising means for adjusting a dimension between the free ends.

6. The fixture according to claim 5, wherein the means for adjusting comprises at least one jackscrew threadedly engaged in one of the free ends and operable to exert a force on the other of the free ends for adjusting a dimension between the free ends by deformation of the body.

7. The fixture according to claim 4, wherein the body defines an aperture extending to an interior of the C-shaped cross-section.

8. The fixture according to claim 4, wherein the free ends include gib members removably attached to the body.

9. The fixture according to claim 1, wherein the body defines threaded holes which receive fasteners for connecting the body to a support.

10. A fixture for handling an article, comprising:

a body defining a track which has a length extending between upstream and downstream ends, the track being configured for confining the article to sliding movement along the length, the track being open along at least a portion of the length so as to provide access for performing an operation on the article;

a check means disposed relatively upstream along the track for permitting the article to pass along the track in a downstream direction and for preventing the article to pass the check means in an upstream direction; and, a stop means disposed downstream from the check means for preventing inadvertent downstream movement of the article;

wherein at least one of the check means and the stop means comprises a finger member pivotable between a first position extending into the track wherein the article is prevented from passing in the upstream direction, and a second position withdrawn from the track, and further comprising a spring member biasing the finger member to the first position, the finger member being pivotable to the second position against the biasing of the spring member upon application of a downstream force to permit the article to pass in the downstream direction.

11. The fixture according to claim 10, wherein the stop means is spaced from the check means by a distance equal to a length of the article, such that the article may be confined between the check means and the stop means.

12. The fixture according to claim 11, further comprising means for adjusting the distance between the check means and the stop means.

13. The fixture according to claim 10, wherein the body has a substantially C-shaped cross-section, and the track is defined between free ends of the C-shaped cross-section.

14. The fixture according to claim 13, further comprising means for adjusting a dimension between the free ends.

15. The fixture according to claim 14, wherein the means for adjusting comprises at least one jackscrew threadedly engaged in one of the free ends and operable to exert a force on the other of the free ends for adjusting a dimension between the free ends by deformation of the body.

16. The fixture according to claim 13, wherein the body defines an aperture extending to an interior of the C-shaped cross-section.

17. The fixture according to claim 13, wherein the free ends include gib members removably attached to the body.

18. The fixture according to claim 10, wherein the body defines threaded holes which receive fasteners for connecting the body to a support.

19. A fixture for handling an article, comprising:

a body having a substantially C-shaped cross-section which defines a track between free ends thereof, the track having a length extending between upstream and downstream ends and being configured for confining the article to sliding movement along the length;

a check means disposed relatively upstream along the track for permitting the article to pass along the track in a downstream direction and for preventing the article to pass the check means in an upstream direction;

a stop means disposed downstream from the check means for preventing inadvertent downstream movement of the article; and, at least one jackscrew threadedly engaged in one of the free ends and operable to exert a force on the other of the free ends for adjusting a dimension between the free ends by deformation of the body.

* * * * *